(No Model.)
J. CHARLTON.
MACHINE FOR WELDING TUBES.
No. 263,481.  Patented Aug. 29, 1882.
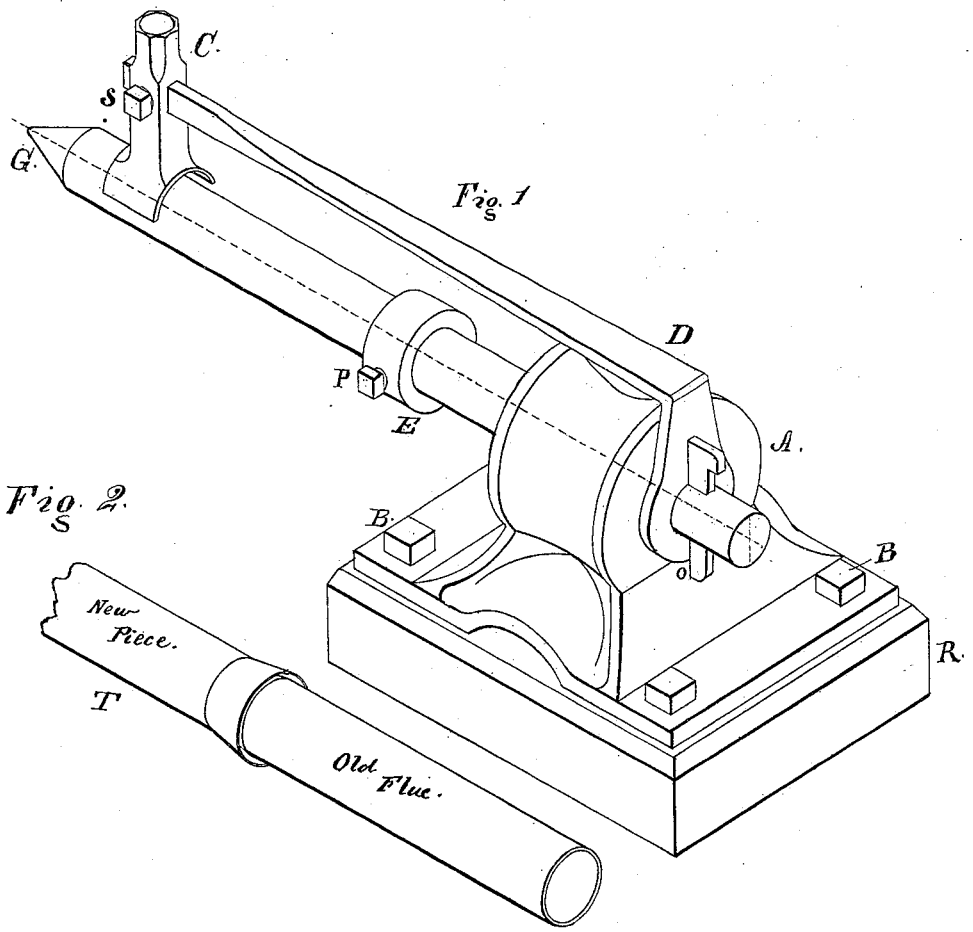
Fig. 1
Fig. 2
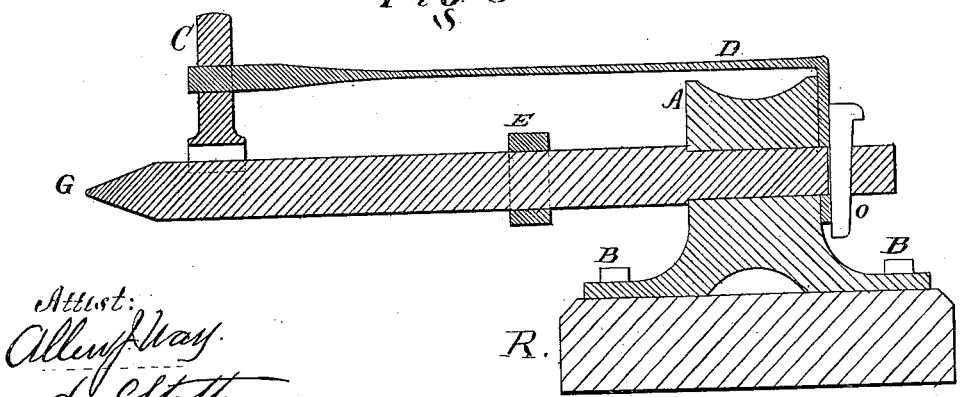
Fig. 3
Attest:
Allen J. Way
A. Stott
Inventor:
James Charlton

UNITED STATES PATENT OFFICE.

JAMES CHARLTON, OF HOUSTON, TEXAS.

MACHINE FOR WELDING TUBES.

SPECIFICATION forming part of Letters Patent No. 263,481, dated August 29, 1882.

Application filed January 17, 1881. (No model.)

*To all whom it may concern:*

Be it known that I, JAMES CHARLTON, a citizen of the United States, residing in the city of Houston, in the county of Harris and State of Texas, have invented a certain new and useful Improvement in Machines for Welding Flues; and I do hereby declare that the following is a full, clear, and exact description thereof, which will enable others skilled in the art to which it appertains to make and use the same, reference being had to the accompanying drawings, which form a part of this specification, and in which—

Figure 1 is a perspective view of my improved flue-welder. Fig. 2 is a view showing the manner of putting the parts of the tube to be lengthened by welding together, and Fig. 3 is a longitudinal vertical sectional view of the machine.

Similar letters of reference indicate corresponding parts in all the figures.

My invention has relation to machines for welding flues; and it consists in the improved construction and combination of operative parts, as hereinafter more fully described and claimed.

In the accompanying drawings, the letter G represents a mandrel, the slotted rear end of which is inserted through and held in a head or upright, A, which is fastened, by bolts B B or otherwise, to a base or support, R, of suitable height.

E is a collar or sleeve which slides upon the mandrel G, and may be fixed in any given position thereon by means of a set-screw, P.

C is a swage, which is fastened by a set-screw, S, at the outer end of a spring, D, the inner end of which is bent at a right angle and provided with an opening or aperture, by means of which it may be slipped over or inserted upon the rearwardly-projecting slotted end of the mandrel G. A key, O, inserted through the slot in the mandrel, serves the double purpose of fastening both the mandrel G and spring D in the head or upright A, and by withdrawing this key both the mandrel and its spring may readily be removed.

The operation of this machine is as follows: The tube or flue to be lengthened by having a piece or extension, T, welded to it is put together by overlapping, as shown in Fig. 2, when the parts are brought to a welding-heat and slipped upon the mandrel G, the collar E of which is first properly adjusted to so gage the flue that the joint to be welded will come directly under the swage C. By striking the top or anvil of the swage with a hammer or other suitable implement, the flue being at the same time rotated upon the mandrel, the joint is evenly welded all around, spring D bringing the swage back into its normal or elevated position after each blow, in which position it is sufficiently high above the mandrel to permit of the easy removal of the welded flue after the operation is complete.

Having thus described my invention, I claim and desire to secure by Letters Patent of the United States—

1. In a flue-welding machine, the combination, with the base, of the upright provided with an opening through it, the removable mandrel provided with an adjustable gage-collar and having a slot through its rearwardly-projecting end, the spring carrying the swage, and means for securing the spring and mandrel in position, substantially as set forth.

2. The herein-described flue-welding machine, consisting of the base R, upright A, having an opening through it, removable mandrel G, slotted at its projecting rear end, spring D, carrying the detachable swage C at its free end, and key O for securing the spring and mandrel in position, substantially as and for the purpose set forth.

JAMES CHARLTON.

Witnesses:
ALLEN J. WAY,
A. STOTT.